United States Patent
Meyers et al.

[15] 3,669,498
[45] June 13, 1972

[54] SEAT STRUCTURE

[72] Inventors: John S. Meyers, Ann Arbor; Nicholas Wolofski, Whitmore Lake, both of Mich.

[73] Assignee: Hoover Ball and Bearing Company, Saline, Mich.

[22] Filed: Aug. 3, 1970

[21] Appl. No.: 60,317

[52] U.S. Cl. ........................... 297/452, 297/455, 297/460
[51] Int. Cl. ...................... A47c 7/20, A47c 7/14, B60n 1/06
[58] Field of Search ................. 297/396, 452, 454–460, 297/DIG. 1; 5/351, 354, 355

[56] References Cited

UNITED STATES PATENTS

| | | | |
|---|---|---|---|
| 3,529,866 | 9/1970 | Getz | 297/452 |
| 3,363,943 | 1/1968 | Getz et al. | 297/458 X |
| 3,537,752 | 11/1970 | Kushnarov et al. | 297/456 |
| 3,111,344 | 11/1963 | Hoven et al. | 297/460 X |
| 3,005,213 | 10/1961 | Brown et al. | 5/354 |
| 3,411,824 | 11/1968 | White et al. | 297/45.2 |
| 3,612,607 | 12/1971 | Thohr | 297/DIG. 1 |

*Primary Examiner*—Casmir A. Nunberg
*Attorney*—Olsen and Stephenson

[57] ABSTRACT

A seat structure consisting of a seat cushion unit and a seat back unit wherein each of said units comprises a foam body and a spring assembly embedded in the body. The seating units are mounted on a frame and each spring assembly includes a plurality of spaced linear springs which project from the foam body and are attached to the frame so as to mount the seating unit on the frame. In the seating cushion unit, the linear springs, border wire and bolster wires cooperate to provide desired seating resilience and the spring end portions are snapped over upstruck tabs formed on the frame. In the seating back unit, the spring end portions extend through mounting slots in the frame. In both units, the springs are connected by bolster wires and the foam bodies are formed with grooves aligned with the bolster wires to enable mounting of the seat structure covering on the foam bodies by attachment to the bolster wires.

14 Claims, 13 Drawing Figures

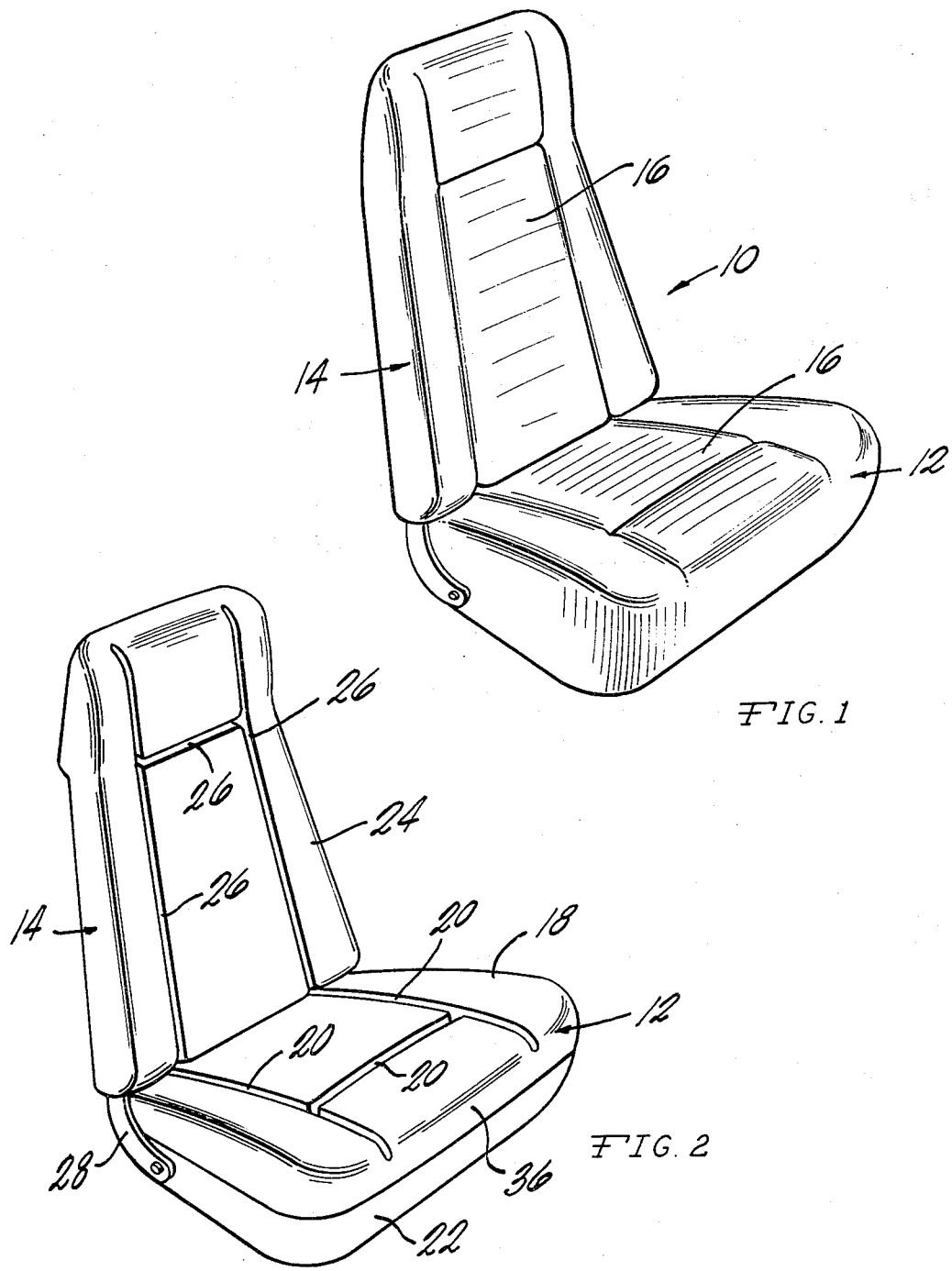

INVENTORS
JOHN S. MEYERS
NICHOLAS WOLOFSKI
BY Olsen and Stephenson
ATTORNEYS

INVENTORS
JOHN S. MEYERS
NICHOLAS WOLOFSKI
BY *Olsen and Stephenson*
ATTORNEYS

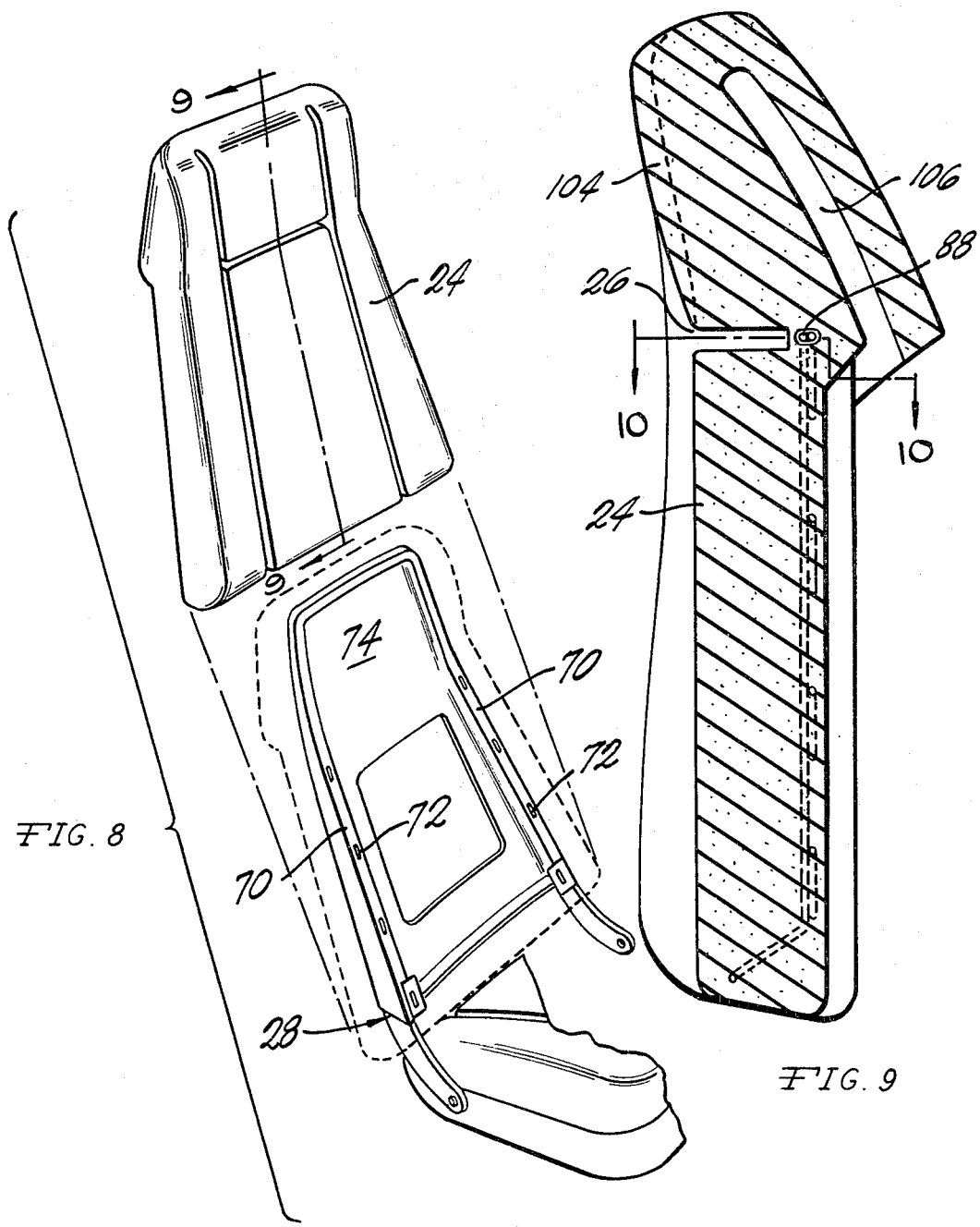# 3,669,498
INVENTORS
JOHN S. MEYERS
NICHOLAS WOLOFSKI
BY
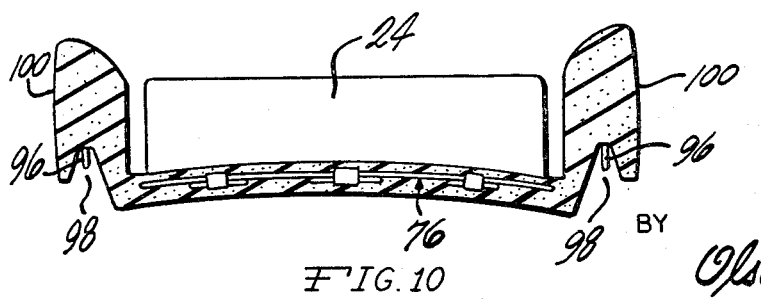
ATTORNEYS

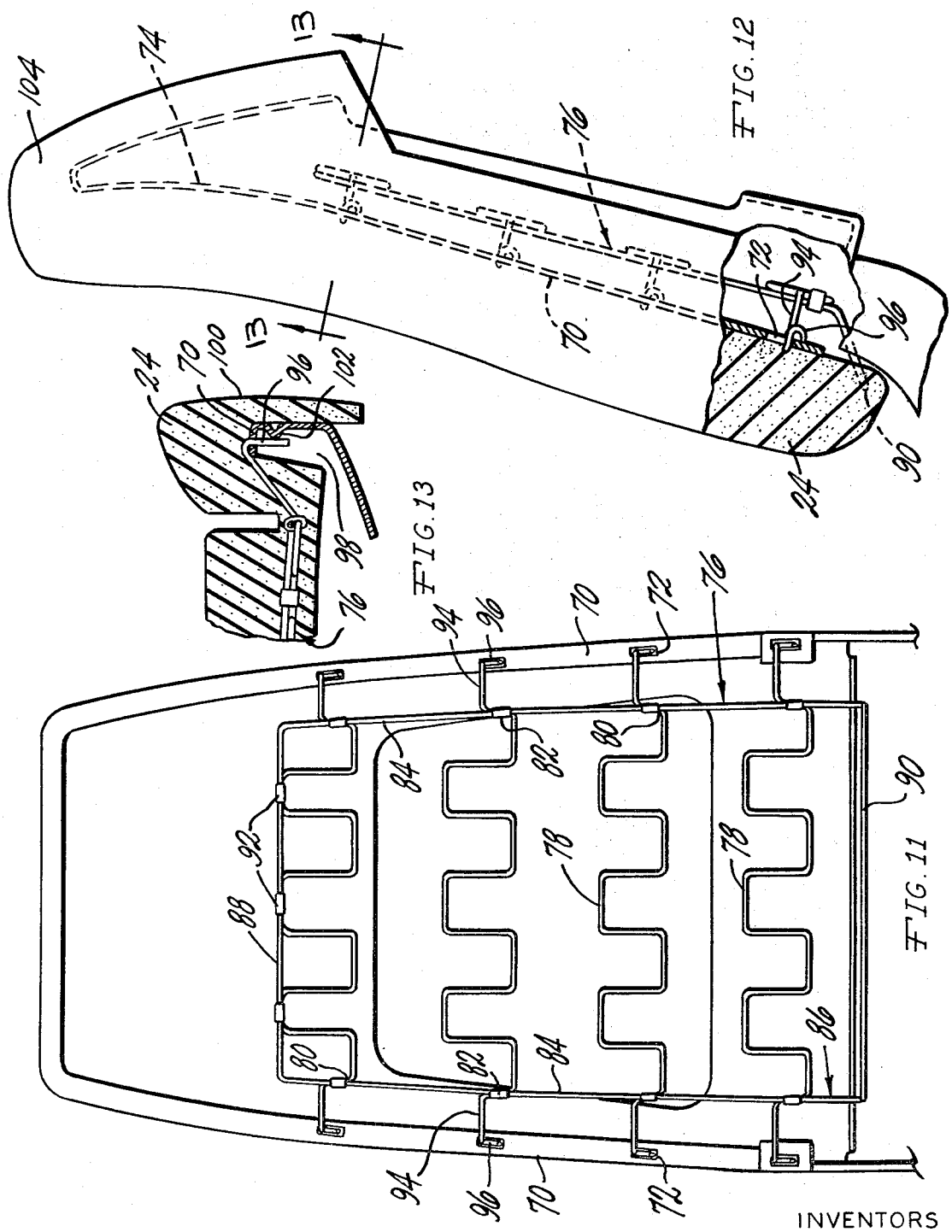

3,669,498

SEAT STRUCTURE

BACKGROUND OF THE INVENTION

In the seating field, particularly the automotive seating field, the use of seating units consisting of a combination of springs and foam is becoming more extensive. Past structures of this type have been objectionable from the standpoint of both difficulty of attachment of the seating units to the frame and the cooperative association of the springs and the foam to obtain desired seating comfort. It is an object of the present invention, therefore, to provide an improved seat structure which overcomes these objections.

SUMMARY OF THE INVENTION

The seat structure of this invention consists of a seating cushion unit and a seating back unit, each of which is comprised of a foam body having a spring assembly embedded in the body. A frame is provided on which the cushion unit is mounted and a frame for the back unit is mounted on the frame for the cushion unit. The spring assembly in each unit consists of a plurality of spaced linear springs, of corrugated type, which can be either conventional sinuous springs or conventional formed wire springs, and the springs are embedded in the foam body so that they have mounting end portions which project from the body. These mounting end portions are utilized to conveniently mount the units on the frames. In addition, the embedded wire is arranged in the cushion unit so as to provide the desired bucket shape and provide for a cooperative functioning of linear springs, bolster wires, and border wire to provide desired seating comfort. In both units, the bolster wires are aligned with grooves in the foam bodies to enable mounting of the covering material on the seat structure by hog ringing the material to the bolster wires. Thus, in the improved seat structure of this invention, the seating cushion and back units are readily formed by molding foam bodies with spring assemblies embedded therein and having mounting end portions projecting therefrom which enable ready assembly of the units with the supporting frame in a manner such that the seat structure can readily be trimmed with the desired covering material.

Further objects, features and advantages of this invention will become apparent from a consideration of the following description, the appended claims, and the accompanying drawing in which:

FIG. 1 is a perspective view of the improved seat structure of this invention;

FIG. 2 is a perspective view, like FIG. 1, of the seat structure of this invention with the covering material therefor removed;

Figure 4:
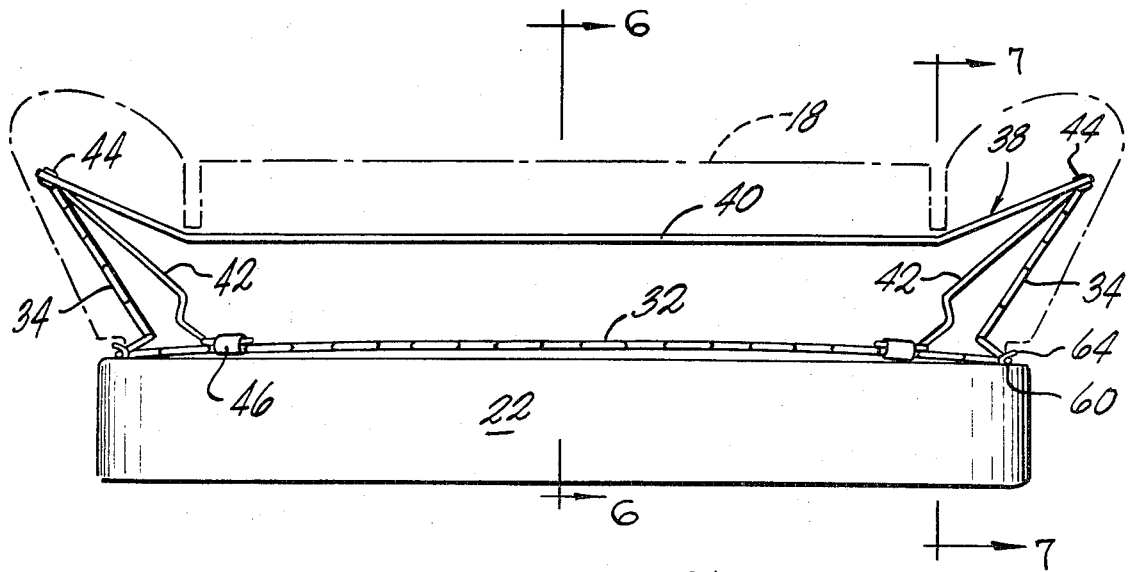
FIG. 4 is a front view of the seating cushion unit of this invention showing the unit mounted on the supporting frame therefor and showing the foam body for the unit in broken lines.
Figure 6:
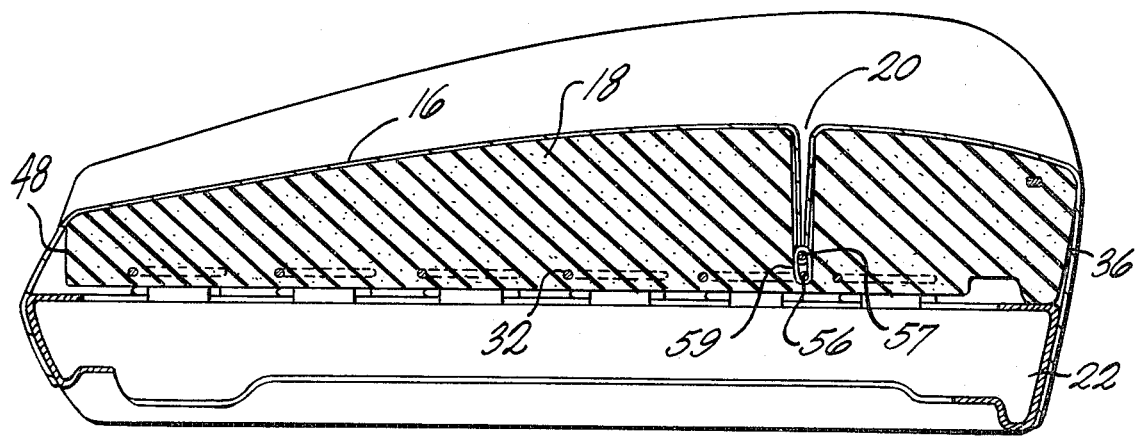
Figure 7:
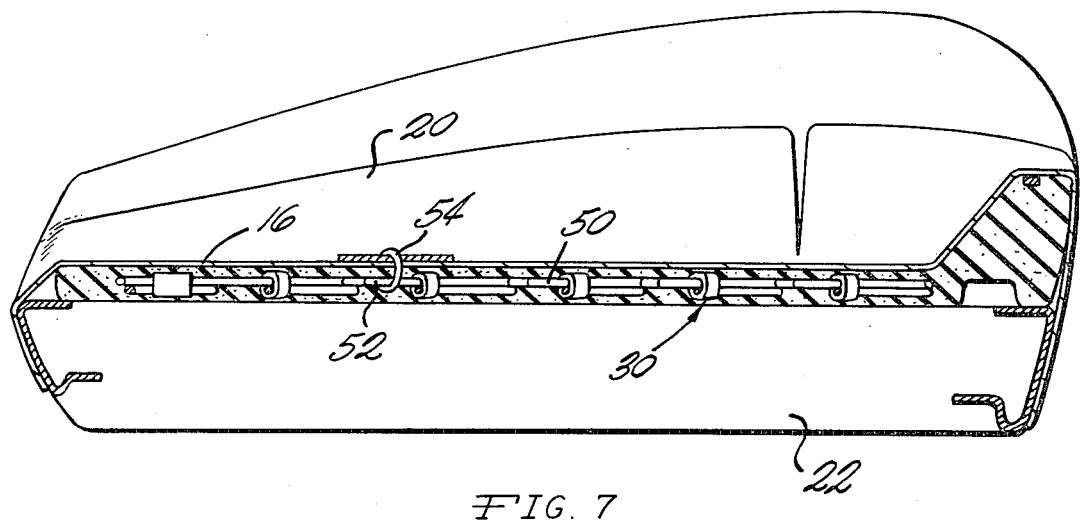

FIGS. 6 and 7 are transverse sectional views of the seating cushion unit of this invention as seen from the lines 6—6 and 7—7 in FIG. 4, respectively;

FIG. 8 is an exploded perspective view of primarily the back portion of the seat structure of this invention;

FIG. 9 is an enlarged sectional view of the seating back unit of this invention as seen from substantially the line 9—9 in FIG. 8;

FIG. 10 is a transverse sectional view of the seating back unit of this invention as seen from substantially the line 10—10 in FIG. 9;

FIG. 11 is a front view of the spring assembly in the seating back unit of this invention showing the assembly being installed on the supporting frame therefor;

FIG. 12 is a side view of the back portion of the seat structure of this invention, with some parts broken away and other parts shown in section for the purpose of clarity; and FIG. 13 is a detail sectional view of a portion of the seat structure of this invention as seen from substantially the line 13—13 in FIG. 12.

With reference to the drawing, the seat structure of this invention, indicated generally at 10, is illustrated in FIG. 1 as consisting of a seating cushion unit 12 and a seating back unit 14, each of which is provided with a conventional trim covering material 16. As illustrated in FIG. 2, in which the covering material 16 is removed, the seating cushion unit 12 includes a foam body 18 which is molded so that it is provided on its top side with grooves 20 for a purpose to appear presently. The seating cushion unit 12 is mounted on a frame 22 in a manner described in detail hereinafter. The seating back unit 14 likewise includes a foam body 24 molded so that it is provided on its front side with grooves 26 and mounted on a frame 28 only a portion of which appears in FIG. 2. The frame 28 is in turn supported on the frame 22.

The seating cushion unit 12 has a spring assembly 30 (FIG. 3) embedded in the foam body 18. The spring assembly 30 consists of a plurality of longitudinally extending linear springs 32 of corrugated shape which are substantially co-planar and are spaced apart in a direction front to rear of the foam body 18. One of the linear springs 32 is provided with outwardly and upwardly inclined end sections 34 located adjacent the front end 36 of the foam body 18. A generally U-shape border wire 38 has a front end portion 40 disposed above the plane of the springs 32, as shown in FIG. 4, and rearwardly extending legs 42 which are secured intermediate their ends, by conventional clips 44, to the terminal ends of the inclined spring end sections 34. The legs 42 extend downwardly and rearwardly and are secured by clips 46 at their rear ends to the linear spring 32 which is disposed adjacent the rear end 48 of the foam body 18.

Figure 3:
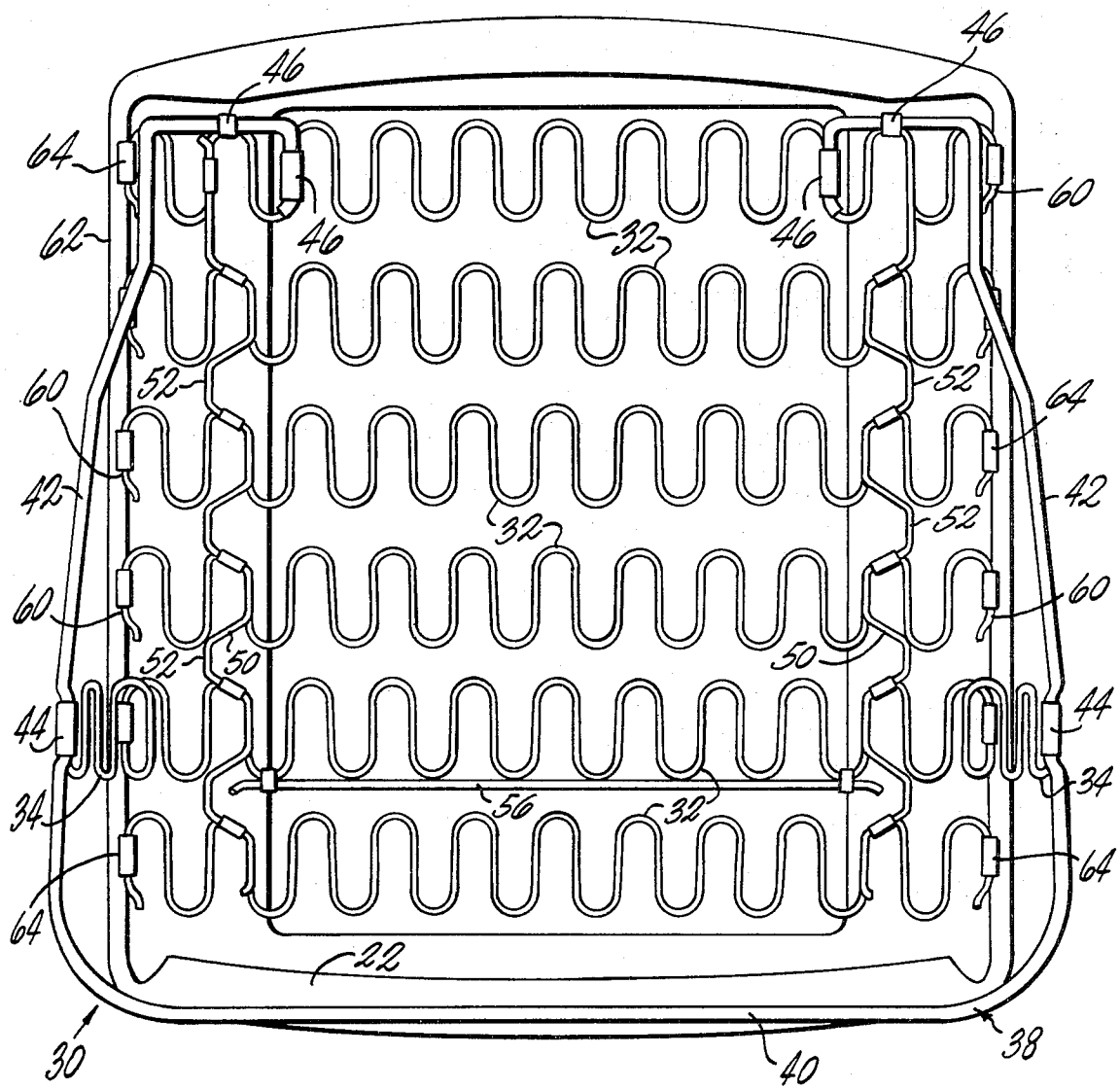
FIG. 3 is a top view of the spring assembly in the seating cushion unit of this invention showing the spring assembly mounted on the supporting frame therefor.

A pair of bolster wires 50, spaced apart in a direction transversely of the foam body 18, are secured to and extend between the linear springs 32 so as to maintain the springs 32 in the transversely spaced relation shown in FIG. 3. Straight portions 52 of the bolster wires 50 are aligned with and positioned adjacent the bottoms of a pair of the grooves 20, as shown in FIG. 7, to enable the application of hog rings, such as the one shown at 54 in FIG. 7 to the covering material 16 and the straight portions 52 so as to mount the covering material 16 on the seating cushion unit 12. A third bolster wire 56 (FIG. 3) is secured to and extends longitudinally of one of the linear springs 32 in alignment with another one of the grooves 20 to also enable attachment of the covering material 16 to the spring assembly 30 at a position near the front side 36 of the foam body 18. Conventionally, a wire 57 (FIG. 6) is secured, by sewing or the like, to the covering 16 and a hog ring, like the one shown at 59, is used to connect the wires 56 and 57.

Figure 5:
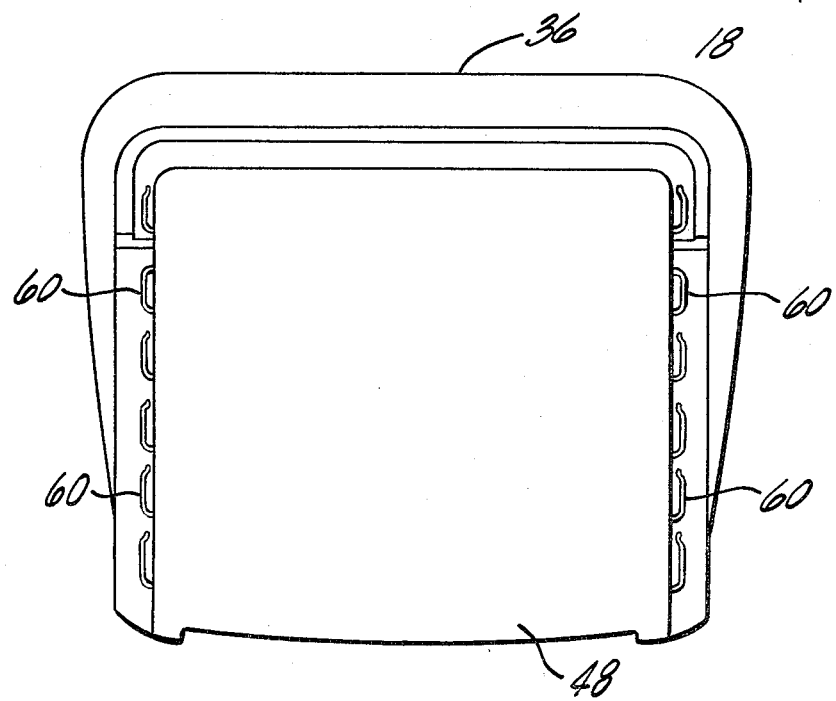
FIG. 5 is a bottom view of the seating cushion unit of this invention.

The linear springs 32 are provided with mounting end portions 60 which project from the foam body 18 as shown in FIG. 5. In the case of all the linear springs 32 except the spring which has the end sections 34, the mounting end portions 60 constitute the ends of the spring. As shown in FIG. 5, the mounting portions 60 at corresponding ends of the springs 32 are arranged in substantial alignment. This arrangement of the mounting end portions 60 enables ready mounting of the seating cushion unit 12 on the frame 22, in the manner hereinafter described. As shown in FIG. 3, the frame 22 has side rails 62 which are provided with upstruck tabs 64. The seating cushion unit 12 is assembled on the frame 22 by snapping the spring mounting end portions 60 over the tabs 64 so as to place the springs 32 in tension. The tension in the springs 32 then maintains the unit 12 in an attached relation with the frame 22 during use of the seat structure 10. The linear springs 32, the bolster wires 50 and the border wire 38 cooperate with the foam body 18 to impart the desired bucket shape to the cushion unit 12 and also cooperate to provide the desired yieldable resistance to seating loads which imparts seating comfort to the structure 10.

As shown in FIG. 8, the frame 28 for the seating back unit 14 includes a pair of side rails 70 provided with slots 72 and an upper extension 74 disposed above the slots 72 for a purpose to appear presently. The back unit 14 includes a spring assembly 76 (FIG. 11), which is embedded in the foam body 24 and includes a plurality of linear springs 78, of corrugated shape, which are spaced apart in a vertical direction. The linear springs 78 have straight portions 80 which are arranged in substantially vertical alignment and are secured by conventional clips 82 to side portions 84 of a bolster wire 86 which also includes a top portion 88 and a bottom portion 90. The top portion 88 is secured to the upper most linear spring 88 by clips 92 and the bottom portion 90 extends downwardly and forwardly in the foam body 24 for seating comfort purposes.

The linear springs 78 include mounting end portions 94 which terminate in hook shape extensions 96 arranged in a spaced relation which enables their alignment with the frame slots 72 as shown in FIG. 11. As shown in FIG. 13, the hook shape extensions 96 project out of the foam body 24 into grooves 98 formed in the rear side of the body 24 adjacent the sides 100 thereof. This arrangement of the hook shape extensions 96 enables assembly of the unit 14 with the frame 28 by aligning the extensions 96 with the slots 72 as shown in FIG. 11, followed by movement of the extensions 96 rearwardly through the slots 72 and then downwardly so that the extensions 96 are engaged with the rear sides of the frame side rails 70. Elongated projections 102 in the side rails 70 (FIG. 13) are engaged with the extensions 96 to prevent accidental release of the spring assembly 76 from the frame 28.

As shown in FIGS. 9 and 12, the foam body 24 is formed with an upper extension 104 which is disposed above the frame assembly 76 and is provided with a downwardly opening cavity 106. During assembly of the unit 14 with the frame 28, the body extension 104 fits over the frame extension 74 which extends upwardly into the cavity 106. This arrangement provides the seating back unit 14 with an upper foam extension to thereby impart added seating comfort to the occupant of the seat structure 10. The bolster wire portions 84 and 88 are aligned with the grooves 26 in the foam body 24 to enable attachment of the seat covering material 16 to the bolster wire 86 by the conventional hog ring process heretofore described. Also, the positioning of the frame side rails 70 in the grooves 98 in the body 24 provides for a covering of the sides of the frame 28 by the foam body 24 for safety purposes.

From the above description, it is seen that this invention provides a seat structure 10 consisting of a seating cushion unit 12 and a seating back unit 14 which are readily mounted on the frames 22 and 28 by virtue of the provision of mounting end portions on the spring assemblies which are embedded in the foam bodies 18 and 24, respectively. By virtue of cooperative assembly of the linear springs, bolster wire and border wire in the cushion unit 12, improved seating comfort is imparted to the seating occupant and this comfort is further improved by the arrangement of the spring assembly 76 in the back unit 14 and the foam extension 104 thereof which fits on the frame extension 74.

What is claimed is:

1. In a seat structure, a rigid frame having side rails, a seating unit comprising a foam body and a spring assembly embedded in said body, said spring assembly including a plurality of spaced linear springs adapted to yieldably resist seating loads, means connecting said linear springs, at least some of said springs being provided with mounting end portions which project from said foam body, and means on said frame side rails and integral therewith engaged with each of said end portions so as to mount said end portions on said frame and positively locate said end portions in fixed positions on said frame so that when said linear springs are subjected to seating loads said end portions are prevented by said side rails from moving relative to each other.

2. The structure according to claim 1 wherein said means connecting said linear springs comprises at least one bolster wire providing an attachment to which covering material for said seat structure can be attached.

3. The structure according to claim 2 wherein said mounting end portions at corresponding ends of said springs are arranged in a substantially aligned relation.

4. The structure according to claim 3 wherein said means on said frame rails comprises outwardly extending tab members and wherein said spring end portions are snapped over said tab members with said springs in tension.

5. The structure according to claim 3 wherein said means on said frame rails comprises frame portions provided with slots through which said spring end portions extend and engage said frame portions.

6. In a seat structure, a seat cushion for mounting on a rigid frame comprising a foam body having a front end and a rear end, a spring assembly embedded in said body, said spring assembly comprising a plurality of side-by-side longitudinally extending transversely spaced linear springs adapted to yieldably resist seating loads, said linear springs extending transversely of said body and being spaced apart in a direction front to rear of said body, means connected to and extending between said linear springs, one of said linear springs adjacent the front end of said body having upwardly and outwardly inclined end sections, and a generally U-shape border wire having an intermediate section at the front end of said body extending transversely thereof at a level above said linear springs and rearwardly extending leg sections secured to the upper ends of said inclined end sections.

7. The structure according to claim 6 wherein said border wire leg sections extend downwardly and rearwardly and are secured at the terminal ends thereof to one of said linear springs adjacent the rear end of said foam body.

8. The structure according to claim 7 wherein said linear springs are of corrugated shape and some of said springs terminate in transversely extending end portions which project out of said body and are arranged in substantial alignment on opposite sides of said body.

9. The structure according to claim 6 wherein said means connected to and extending between said linear springs comprises a pair of spaced bolster wires extending front to rear of said body and connected to said linear springs adjacent the ends thereof.

10. The structure according to claim 9 further including a third bolster wire secured to and extending longitudinally of one of said linear springs adjacent the front end of said body.

11. In a seat structure, a rigid frame having side rails, a seat back comprising a foam body having a top end, a bottom end and a pair of sides, a spring assembly embedded in said body, said assembly comprising a plurality of corrugated springs extending in a direction side to side in said body and spaced apart in a direction top to bottom in said body, each of said springs having torsion bars provided with straight portions, means in said body secured to and extending between said torsion bar straight portions so as to connect said corrugated springs, each of said corrugated springs terminating at the ends thereof in hook shape extensions which project from said body, said side rails having slots into which said hook shape extensions project and engage said side rails, said side rails locating said hook shape extensions in fixed positions on said frame so that when said corrugated springs are subjected to load said extensions are prevented by said side rails from moving relative to each other.

12. The structure according to claim 11 wherein said body is formed with grooves adjacent said sides extending in a direction from top to bottom of said body, and said extensions project from said body into said grooves.

13. The structure according to claim 11 wherein said means connecting said linear springs comprises a bolster wire having straight portions and wherein said body is formed with grooves aligned with and terminating at the bottom ends thereof adjacent said straight portions.

14. The structure according to claim 12 wherein said body has a top end portion disposed above said spring assembly and shaped to form a downwardly opening cavity into which said rigid frame projects.

* * * * *